(12) United States Patent
Eichorst et al.

(10) Patent No.: US 6,502,080 B1
(45) Date of Patent: Dec. 31, 2002

(54) AUTOMATIC LEASE RESIDUAL MANAGEMENT SYSTEM

(75) Inventors: Michael Eichorst, Middle Village, NY (US); Ulf K. Ghosh, Montclair, NJ (US); Marc Leibovic, Irvington, NY (US); Randal E. Blank, South Orange, NJ (US); Simon Osei-Agyemang, Holbrook, NY (US); Jiang Ren, Bellerose, NY (US); Steven S. Tam, Plainsboro, NJ (US)

(73) Assignee: The Chase Manhattan Bank, NY (US)

( * ) Notice: Subject to any disclaimer, the term of this patent is extended or adjusted under 35 U.S.C. 154(b) by 0 days.

(21) Appl. No.: 09/387,669

(22) Filed: Aug. 31, 1999

(51) Int. Cl.[7] .............................................. G06F 17/60
(52) U.S. Cl. ..................................................... 705/400
(58) Field of Search .............................. 705/400, 4, 38

(56) References Cited

U.S. PATENT DOCUMENTS

| | | | | |
|---|---|---|---|---|
| 5,774,883 A | * | 6/1998 | Andersen et al. | 705/35 |
| 5,893,072 A | * | 4/1999 | Zizzamia | 705/4 |
| 6,038,554 A | * | 3/2000 | Vig | 705/1 |
| 6,049,784 A | * | 4/2000 | Weatherly et al. | 705/1 |

FOREIGN PATENT DOCUMENTS

JP 10143564 A * 5/1998

OTHER PUBLICATIONS

DCR Comments on 1998 Automobile Lease Transactions, Feb. 5, 1999, New Tork/PRNewswire, Duff & Phelps Credit Rating Co.*

* cited by examiner

Primary Examiner—James P. Trammell
Assistant Examiner—Daniel L. Greene
(74) Attorney, Agent, or Firm—Dickstein, Shapiro, Morin & Oshinsky LLP

(57) ABSTRACT

A method of predicting a net reserve for a vehicle leased by a lessee from a lessor in accordance with a lease, the method comprising the acts of: predicting a market value loss of the vehicle at a scheduled maturity date of the lease, the predicted market value loss being a function of: (i) a probability that the vehicle will be returned to the lessor after the lease; (ii) at least one predicted price at which the vehicle may sell after the lease; and (iii) a residual value of the vehicle, the residual value being an aggregate of at least a projected price of the vehicle at the scheduled maturity date made prior to the lease and an enhancement amount; and obtaining the net reserve of the vehicle as a function of the predicted market value loss.

34 Claims, 4 Drawing Sheets

AUTOMATIC LEASE RESIDUAL MANAGEMENT SYSTEM

BACKGROUND OF THE INVENTION

1. Field of the Invention

The present invention relates to a method and/or system for determining a net reserve amount for a leased vehicle and/or a reserve position concerning a portfolio of such leased vehicles.

2. Related Art

The leasing of vehicles is becoming more common among consumers and, therefore, those entities owning leased vehicle portfolios are interested in predicting profits/losses on the portfolio. Often, the owners of leased vehicle portfolios are automotive manufacturers and/or financial institutions (such as the Chase Manhattan Bank).

It is useful to review known car leasing procedures prior to discussing the particularities of the invention. A (potential) lessor will become the owner of a vehicle for lease by paying a so-called vehicle cost (which includes any negotiated reduction) to, for example, a manufacturer of the vehicle. The retail price of the vehicle is often equal to the vehicle cost; however, the retail price may vary from the vehicle cost as a function of the negotiated reductions and/or options included with the vehicle.

The lessor of the vehicle and a lessee (e.g., a consumer) will enter into a lease contract to lease the vehicle for a period of time, the lease term. Often the lease term begins in a so-called book month (month that the lease was entered into) and ending on a so-called scheduled maturity date. The lease contract will specify an amount of money that the lessee pays to lease the vehicle, usually on a monthly basis.

The contract typically will set a so-called residual value on the vehicle which represents a price that the lessee may pay at the scheduled maturity date to purchase the vehicle from the lessor should the lessee wish to do so. Otherwise, the lessee returns the vehicle to the lessor. The residual value is usually obtained by taking the a projected price of the vehicle at maturity from a publication, such as the Auto Lease Guide's (ALG), and adding an enhancement. The ALG projected price is widely accepted as a good guess as to the auction price that will be paid to purchase the vehicle at maturity. Adding the enhancement to the ALG's projected price assures that the lessee will pay less each month to lease the vehicle (assuming that the enhancement was positive) and, therefore, provides an incentive for the lessee to lease the vehicle from that particular owner. It is noted that the enhancement may also be zero, or the enhancement may be negative if the lessor wishes the lessee to pay more per month to lease the vehicle (for example, where the lessor believes that the ALG projected price of the vehicle at maturity is too optimistic).

It is noted that the lessor may wish to "set aside" a reserve amount for each vehicle to cover potential losses which may occur when and if the lessee chooses to return the vehicle at termination of the lease as opposed to purchasing the vehicle.

For example, it is assumed that a lessor has consulted the ALG and determined that a vehicle which he wishes to lease to a lessee will theoretically auction for $10,000 at a scheduled maturity date (e.g., 24 months in the future). Further, the lessor selects an enhancement amount of $1,000, resulting in a residual value of $11,000. The lease will set forth a monthly payment to be made by the lessee to the lessor over the 24-month period to cover the difference between the vehicle cost (i.e., the cost for the lessor to obtain ownership of the vehicle) and the residual value. The lessor sets aside a reserve amount to cover, for example, a loss should the lessee decide to return the vehicle at termination of the lease. The loss would occur because the lessor would obtain $10,000 for the vehicle (the ALG predicted value of the vehicle), thereby losing $1,000 (the enhancement amount).

Assuming that the probability that the lessee will return the vehicle at termination of the lease is 50%, the lessor may wish to establish a reserve amount to be $500 (50% of $1,000). It is noted that the lessor will theoretically not experience a gain or loss if the lessee chooses to purchase the vehicle at the residual value when the lease terminates.

Often, lessor's wish to obtain actual auction prices for used vehicles. The so-called Black Book provides MSRP values and actual auction prices for used vehicles on a periodic basis, typically each month.

A leased vehicle will be worth less at the scheduled maturity date than at the book month due to, for example, depreciation, miles and damage, and/or other market conditions. The difference between the actual value of the vehicle at the scheduled maturity date and the residual value is often referred to as the market value loss. It is desirable for the reserve amount to substantially match the market value loss of the leased vehicle at the scheduled maturity date. This will ensure a proper balance between encouraging a lessee to lease the vehicle and obtaining profits for the lease and/or eventual sale of the leased vehicle.

A net reserve amount for a leased vehicle is equal to the reserve amount less the market value loss. An aggregate of the net reserve for each leased vehicle in a portfolio yields a reserve position for the portfolio, which is an indication of the lease residual risk associated with carrying all of the leased vehicles in the portfolio.

It is desirable to minimize the reserve position for the portfolio. Accordingly, owners of leased vehicle portfolios are interested in predicting the net reserve for each vehicle and the reserve position for a portfolio on a periodic basis so that corrective action may be taken if the magnitude of the reserve position moves substantially away from zero.

SUMMARY OF THE INVENTION

A method of predicting a net reserve for a vehicle leased by a lessee from a lessor in accordance with a lease in accordance with one aspect of the invention comprises the acts of: predicting a market value loss of the vehicle at a scheduled maturity date of the lease, the predicted market value loss being a function of: (i) a probability that the vehicle will be returned to the lessor after the lease; (ii) at least one predicted price at which the vehicle may sell after the lease; and (iii) a residual value of the vehicle, the residual value being an aggregate of at least a projected price of the vehicle at the scheduled maturity date made prior to the lease and an enhancement amount; and obtaining the net reserve of the vehicle as a function of the predicted market value loss.

Other objects, features, and/or advantages of the present invention will become apparent to those skilled in the art from the description herein taken in conjunction with the accompanying drawing.

BRIEF DESCRIPTION OF THE DRAWING

In order to illustrate the invention, there is shown in the drawing a form which is presently preferred. It being understood, however, that the invention is not limited by the particular arrangement shown.

DETAILED DESCRIPTION OF THE INVENTION

Figure 1:
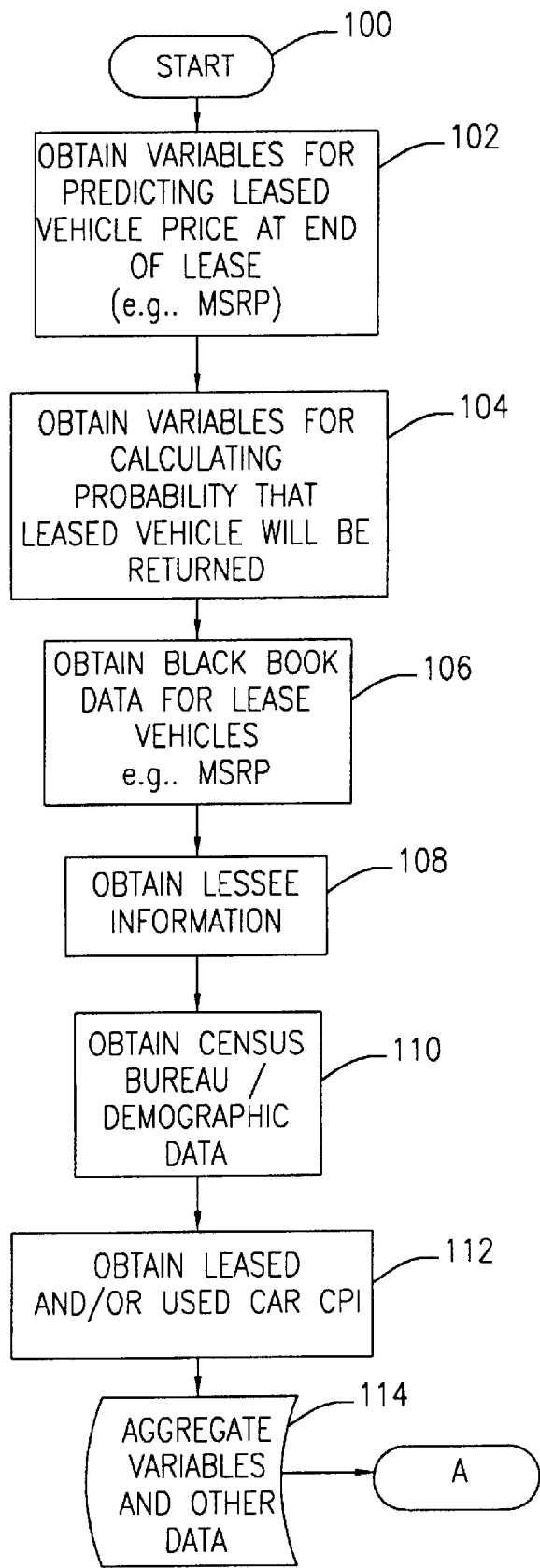
FIG. 1 is a flow diagram illustrating acts carried out in accordance with the invention.

With reference to the drawing wherein like numerals indicate like elements, there is shown in FIG. 1 a series of acts which are preferably carried out in accordance with the invention. The process begins at step 100 (the start) and steps 102–112 involve obtaining data from one or more sources concerning lease vehicles of a portfolio and the lessees who lease, purchase, and/or return the vehicles.

At step 102 a plurality of variables are preferably obtained which are suitable for predicting a price that a returned leased vehicle will fetch, for example, at auction. The variables preferably include at least one of:

i. The vehicle identification number;

ii. A cost of the vehicle, i.e. the cost at which the lessor purchased the vehicle (which includes any negotiated reduction in price);

iii. A retail price of the vehicle, often substantially the same as the vehicle cost;

iv. The model year of the vehicle;

v. The make/model (or marquee) of the vehicle, e.g. "Jeep Grand Cherokee", "Saab 9000 Series", "Saturn SL2", etc.;

vi. A scheduled maturity date of the leased vehicle, i.e., the date according to the lease contract that the lease should terminate and the lessee either returns or purchases the vehicle;

vii. The termination date of the lease, i.e., the actual date that the lease terminates, for example, by lease contract, destruction of the vehicle, etc.; and viii. The residual value of the vehicle.

At step 104 it is preferred that a set of variables be obtained which are suitable for determining a probability of return (PR) of leased vehicles. In particular, it is preferred that these variables include at least one of:

i. The state that the lease originates;

ii. The vehicle's model;

iii. The vehicle's color;

iv. The book month of the lease; i.e., the month in which the lease contract is signed; and v. The reserve amount, i.e., an amount defined by the lessee contract for which the lessee may purchase the vehicle from the lessor at the scheduled maturity date of the lease.

The reserve amount represents funds which are "set aside" to cover any losses/gains when the lessor disposes of the vehicle at the termination of the lease contract. The reserve amount is preferably a function of at least one of: (i) a probability that the vehicle will be returned to the lessor at termination of the lease; and (ii) the enhancement amount of the residual value.

At step 106, it is preferred that data from the so-called Black Book be obtained for any leased vehicles of the lessor. These data preferably include at lease one of:

i. The vehicle identification number;

ii. The manufacturer's suggested retail price (MSRP);

iii. The vehicle's model year; and iv. An average used car wholesale price for the vehicle.

At step 108, the lessor preferably obtains consumer (i.e., lessee) information which includes at least one of:

i. The consumer's outstanding credit line;

ii. The consumer's total income;

iii. The consumer's savings balance;

iv. The consumer's credit risk rating; and v. The loan to value ratio for the vehicle.

Preferably, this information is obtained at the time that the lease is prepared and entered into by the lessee.

At step 110, the lessor preferably obtains census bureau demographic data which includes at least the number of auto loans per household within the demographic profile of the lessee. At step 112, the lessor preferably obtains used car consumer price index information for the vehicles that the lessor leases or intends to lease. The CPI represents expected market conditions for used vehicle sales at scheduled maturity dates for the vehicles being leased. Those skilled in the art will appreciate that CPI data may be obtained using regression analysis models based on at least one of:

i. The consumer confidence index;

ii. New vehicle sales information;

iii. New car affordability; and iv. Lease share of total consumer vehicle credit.

At step 114 it is preferred that the variables and other data obtained in steps 102–112 be aggregated and stored in a database for easy retrieval.

In accordance with the invention, the above variables and data are input into one or more predictive models to obtain a net reserve for each vehicle and a reserve position for all vehicles in a portfolio. The net reserve for a vehicle is preferably a function of the reserve amount and a predicted market value loss (MVL) for the vehicle at the scheduled maturity date. It is most preferred that the net reserve correspond to a difference of the reserve amount and the predicted market value loss (particularly on an aggregate portfolio basis).

Assuming the lessor has a plurality of leased vehicles in his or her portfolio, an aggregate of the net reserve for each vehicle in the portfolio will produce the reserve position for the portfolio. The reserve position provides an indication to the lessor as to whether enough funds have been set aside (i.e., the reserve amounts) to cover losses at lease termination. Indeed, if the aggregated net reserve (reserve position) is negative, the lessor may wish to take corrective action (e.g., setting aside more reserve amount) prior to lease termination or reducing the enhancement amounts for future new leases. Conversely, if the reserve position is positive, the lessor may wish to invest a portion of the aggregated net reserve amounts in other ventures to maximize profits, or increase the enhancement amounts for future leases to make the lessor more competitive in the market.

Figure 2:
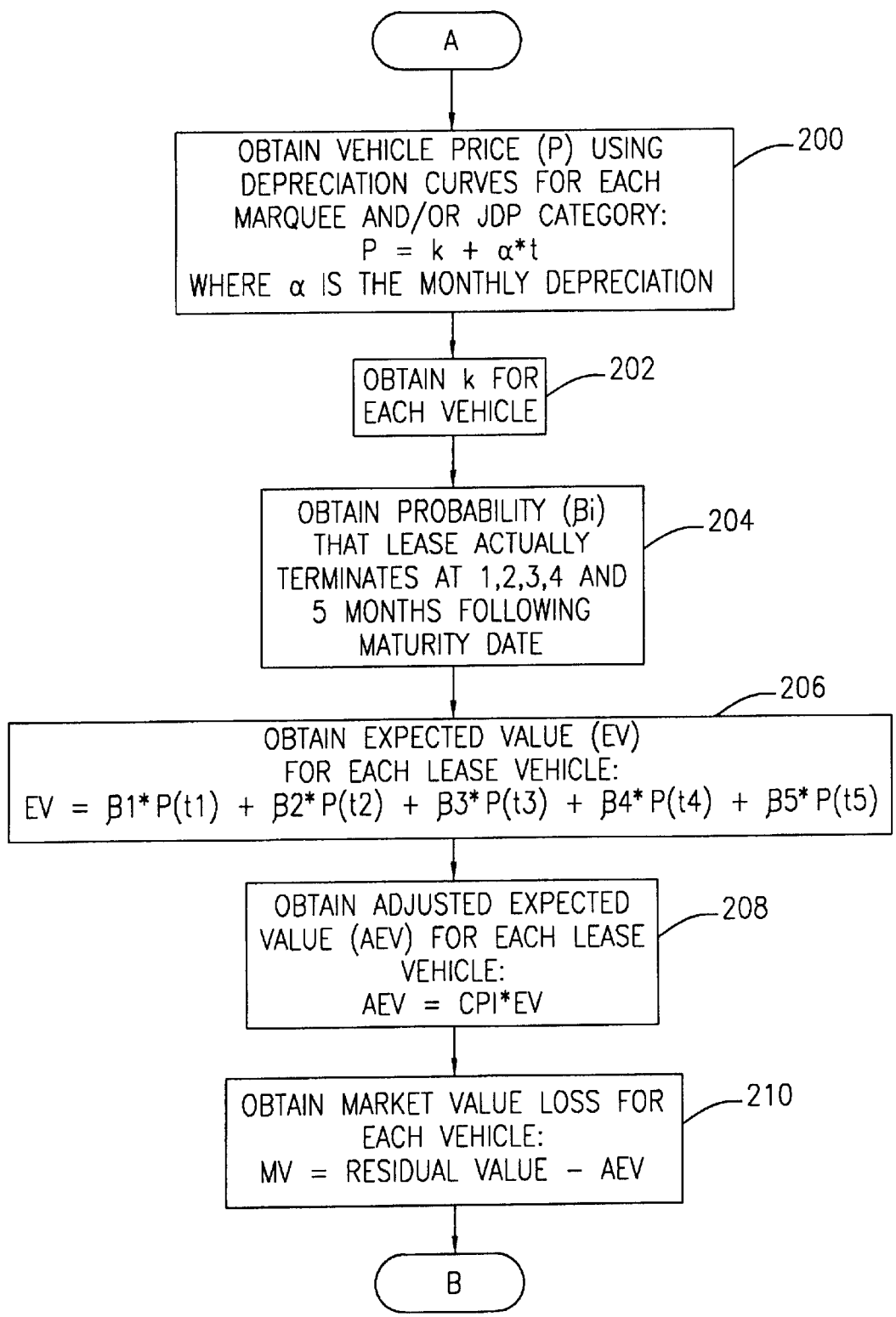
FIG. 2 illustrates additional acts carried out in accordance with the invention.

In determining the net reserve for each vehicle in the lessor's portfolio, it is preferred that the predicted market value loss for each vehicle is a function of at least the depreciation of each vehicle from the signing of a respective lease contract to the corresponding scheduled maturity date of the lease. With reference to FIG. 2, it is preferred that at step 200 an equation for vehicle price (P) be established which is a function of vehicle depreciation. More particularly, it is preferred that a series of depreciation curves be established according to the following equation:

$$P = k + \alpha * t$$

where α is a representation of vehicle depreciation over a particular time period, such as a month, and k represents the value of the vehicle at a predetermined time. It is most preferred that k be obtained for the August of the of the year following the vehicles model year. The value of k may be obtained from the Black Book or may be estimated using a ratio of the vehicle's MSRP and the vehicle cost. For example, experimentation has shown that a k from about 95% to 98% of the vehicle cost (about 96.8% being most preferred), works well in the present invention. It is most preferred that a value of α and a value of k be obtained for each vehicle marquee or JDP category in the lessor's portfolio, it being understood that other vehicle marquees and JDP categories may also be included.

In obtaining the net reserve for each vehicle, it is preferred that the predicted market value loss be a function of at least one of: (i) the depreciation of each vehicle (as discussed above); and (ii) an expected value of the vehicle at the scheduled maturity date.

In general terms, an expected value is a probability of an occurrence multiplied by a value of that occurrence. Here, it is preferred that the expected value of the vehicle at the scheduled maturity date be an aggregate of: (i) a product of the predicted price P of the vehicle at the scheduled maturity date and a probability that the lease will terminate that the scheduled maturity date; and (ii) a product of the predicted price P of the vehicle at a time other than the scheduled maturity date and a probability that the lease will terminate at that time.

With reference to step 204, it is preferred that probabilities Bi be obtained which represent the likelihood that a particular lease will terminate 1, 2, 3, 4, and/or 5 (or more) months following the maturity date. Those skilled in the art will appreciate that times other than months may be utilized without departing from the scope of the invention (e.g., days, fiscal quarters, etc.). The expected value (EV) of the vehicle at the scheduled maturity date (Step 206) may be expressed as follows:

$$EV = B1*P(t1) + B2*P(t2) + B3*P(t3) + B4*P(t4) + B5*P(t5)$$

At step 208, it is preferred that the expected value of each vehicle be adjusted as a function of the CPI, for example, by multiplying the expected value by the CPI number.

In accordance, with the invention, it is preferred that the predicted market value loss for each vehicle be a function of the residual value and the expected value for a particular vehicle, such as difference of the residual value and the expected value. It is most preferred that the predicted market value loss for a vehicle be a function of the residual value and the adjusted expected value for the vehicle, such as a difference of the residual value and the adjusted expected value (step 210).

It is also preferred that the predicted market value loss of each vehicle be adjusted to obtain a predicted return market value loss (RMVL) for the vehicle. The predicted return market value loss is applicable when the lessee returns a vehicle and a time elapses between the return of the vehicle and the sale of the vehicle. The predicted return market value loss of each vehicle is preferably a function of the predicted market value loss and a term which includes at least one of:

i. The manufacturers' suggested retail price (MSRP) of the vehicle;

ii. A prediction of depreciation of the vehicle resulting from any elapsed time between return of the vehicle to the lessor and sale of the vehicle;

iii. A probability that the vehicle will be returned (PR) to the lessor by the lessee at termination of the lease;

iv. A probability (PM) that termination will occur at the scheduled maturity date; and v. miles (esp. excess miles) and damage.

Figure 3:
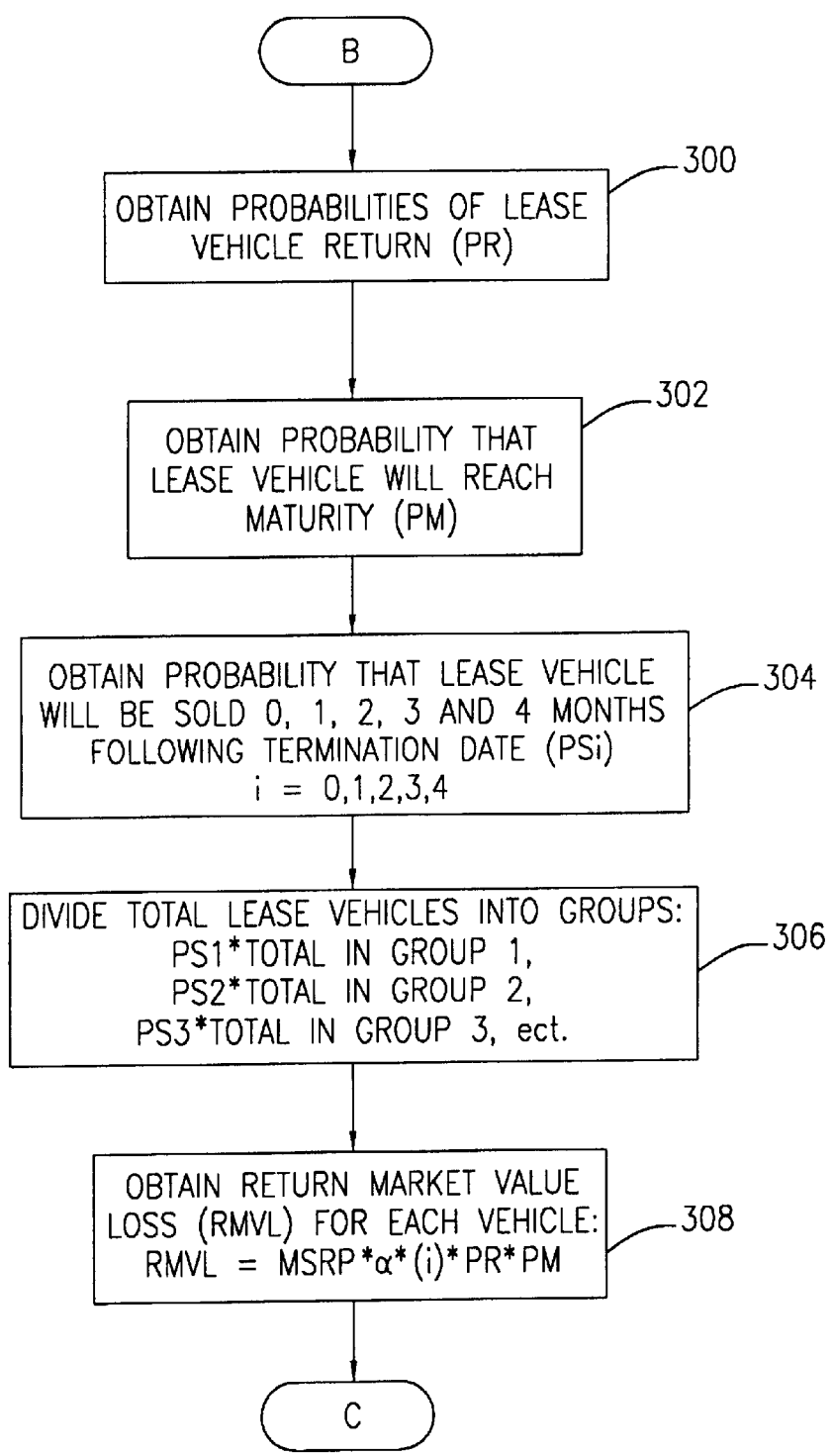
FIG. 3 is a flow diagram illustrating still further acts which are carried out in accordance with the invention.
Figure 4:
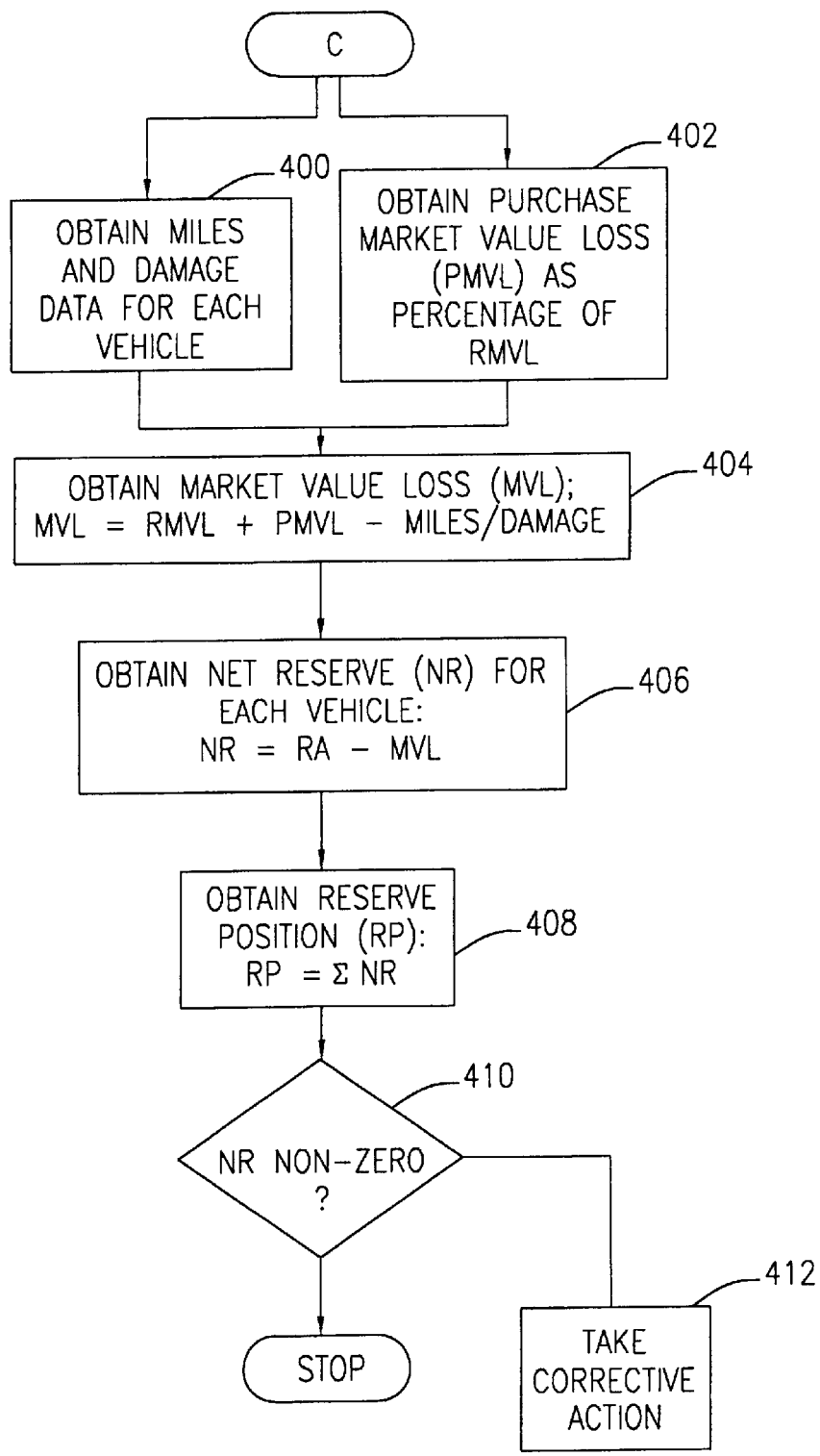
FIG. 4 is a flow diagram illustrating still further acts which are carried out in accordance with the invention.

With reference to FIG. 3, at step 300 a probability that a particular lease vehicle will be returned (PR) is obtained. Preferably, the probability of return is a function of at least one of: (i) the MVL; (ii) a state (ST) in which the lease originated; (iii) the vehicle's model (M); (iv) the lessee's income (INC); (v) the predicted depreciation (D) of the vehicle; (vi) the lessee's savings balance (SAV); (vii) the lessee's credit risk (R); (viii) a number of loans per household (L) for those having the lessee's demographic profile; (ix) the vehicle's loan to value ratio (LTV); (x) the vehicle's color (C); (xi) the vehicle's book month (B); (xii) the reserve amount (RA); (xiii) the lessee's depth of credit experience (DC); and (xiv) a ratio of the MVL and the residual value (MVL/RV).

It is most preferred that the probability of return be expressed according to the following equation:

$$PR = 1/(1 + EXP(-1*(-\alpha + A1*MVL + A2*ST + A3*M + A4*INC + A5*D + A6*SAV + A7*R + A8*L + A9*LTV + A10*C + A11*B + A12*RA + A13*DC + A14*MVL/RV))),$$

where, Ai represent coefficients obtained using regression analysis. Those skilled in the art will appreciate that the values of Ai may be obtained using known regression analyses.

At step 302, a probability that a leased vehicle will reach maturity (PM) is obtained and at step 304 a probability that a leased vehicle will be sold 0, 1, 2, 3, 4 (or more) months following the termination date is obtained. It has been found that about 60% of returned leased vehicles are sold in the month of termination, and about 20%, 10%, 5% and another 5% are sold 1 month, 2 months, 3 months, and 4 months, respectively, after termination. At step 306, it is preferred that the lessor divide the portfolio of leased vehicles into several groups such that 60% are in one group, 20% are in another group, and 10%, 5%, and another 5% are in three additional groups. This may be accomplished at random, by using digits in the vehicle identification numbers, or any other known method.

At step 308, a return market value loss for each vehicle is preferably obtained in accordance with the following equation:

$$RMVL = MVL + (MSRP*(\alpha*t)*PR*PM),$$

where the value of time is the number of months following the termination date that the returned vehicle is sold.

It is most preferred that the predicted market value loss be a function of the at least one of: (i) the predicted return market value loss; (ii) a purchase market value loss (PMVL) (step 402); and (iii) Miles and damage (step 400).

It is most preferred that the predicted market value loss be expressed in accordance with the following equation: MVL= RMVL+PMVL−M&D (step 404), where the purchase market value loss is a predetermined percentage of the return market value loss, about 15% to 22% being most preferred.

At step 406, the net reserve, (i.e., difference of the reserve amount and the market value loss) is obtained for each vehicle of the lessor's portfolio and at step 408, these net reserve values are aggregated to obtain a reserve position for the entire portfolio. If the reserve position is non zero (step 410), then the lessor may wish to take corrective action (step 412), such as adding to the reserve amount or taking away from the reserve amount. Advantageously, the lessor can predict whether his or her reserve position is optimal prior to the termination of the leases in the portfolio and, therefore, may maximize profits during the lease term and/or be more competitive in the market place by increasing/ decreasing market share.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of predicting a net reserve for a vehicle leased by a lessee from a lessor in accordance with a lease, the method comprising the acts of:

predicting a market value loss of the vehicle at a scheduled maturity date of the lease, the predicted market value loss being a function of: (i) a probability that the vehicle will be returned to the lessor after the lease; (ii) at least one predicted price at which the vehicle may sell after the lease; and (iii) a residual value of the vehicle, the residual value being an aggregate of at least a projected price of the vehicle at the scheduled maturity date made prior to the lease and an enhancement amount; and obtaining the net reserve of the vehicle as a function of the predicted market value loss.

2. The method of claim 1, wherein the net reserve of the vehicle corresponds to a difference of a reserve amount and the predicted market value loss, the reserve amount being a function of the product of: (i) the probability that the vehicle will be returned to the lessor; and (ii) the enhancement amount.

3. The method of claim 1, wherein the at least one predicted price at which the vehicle may sell after the lease is a function of at least a depreciation of the vehicle during the lease.

4. The method of claim 3, further comprising the act of: establishing an equation for predicting respective prices P(t) at which the vehicle will sell as a function of the depreciation of the vehicle at particular times (t).

5. The method of claim 4, wherein the equation for predicting prices is in accord with the following expression: $P(t)=\alpha*t+k$, where $\alpha*t$ represents the depreciation of the vehicle as a function of time and k represents the value of the vehicle at a predetermined time.

6. The method of claim 5, wherein k represents the value of the vehicle in the August of the year following the vehicle's model year.

7. The method of claim 5, wherein k is substantially an actual auction value of the vehicle obtained from the Black Book listing of vehicle values.

8. The method of claim 5, wherein k is from about 95% to 98% of a price paid by the lessor of the vehicle to obtain ownership thereof.

9. The method of claim 8, wherein k is about 96.8% of the price paid by the lessor to obtain ownership of the vehicle.

10. The method of claim 5, wherein the predicted market value loss of the vehicle is a function of an expected value of the vehicle at the scheduled maturity date.

11. The method of claim 10, wherein the expected value of the vehicle is an aggregate of: (i) a product of the predicted price P(t) of the vehicle at the scheduled maturity date and a probability that the lease will terminate at the scheduled maturity date; and (ii) a product of the predicted price P(t) of the vehicle at a time other than the scheduled maturity date and a probability that the lease will terminate at that time.

12. The method of claim 11, further comprising the acts of:

obtaining probabilities that the lease will terminate at: (i) the scheduled maturity date, and (ii) a plurality of times subsequent to the scheduled maturity date;

obtaining predicted prices P(t) for the vehicle at the scheduled maturity date and the plurality of times subsequent thereto;

obtaining products of the respective probabilities and predicted prices for the vehicle; and obtaining the expected value of the vehicle by aggregating the respective products.

13. The method of claim 11, wherein the plurality of times subsequent to the respective scheduled maturity date include at least one time in each of a plurality of subsequent months from the scheduled maturity date.

14. The method of claim 13, wherein the plurality of times includes one time in each of about four subsequent months from the scheduled maturity date.

15. The method of claim 12, further comprising the acts of:

obtaining a used car consumer price index (CPI) representing expected market conditions for the sale of the vehicle at the scheduled maturity date; and adjusting the expected value of the vehicle as a function of the CPI.

16. The method of claim 15, wherein the used car (CPI) is obtained from at least one of: a consumer confidence index, new vehicle sales information, new car affordability by consumers, and a lease share of total consumer vehicle credit.

17. The method of claim 11, wherein the predicted market value loss for the vehicle is a function of the residual value and the expected value of the vehicle.

18. The method of claim 17, wherein the predicted market value loss for the vehicle is a difference of the residual value and the expected value of the vehicle.

19. The method of claim 15, wherein the predicted market value loss for the vehicle is a function of the residual value and the adjusted expected value of the vehicle.

20. The method of claim 19, wherein the predicted market value loss of the vehicle is a difference of the residual value and the adjusted expected value of the vehicle.

21. The method of claim 1, wherein the predicted market value loss of the vehicle is adjusted to obtain a predicted return market value loss (RMVL) of the vehicle which results from elapsed time between termination of the lease and sale of the vehicle.

22. The method of claim 21, wherein the predicted return market value loss (RMVL) of the vehicle is an aggregate of the predicted market value loss (MVL) and a term which includes at least one of: (i) the manufacturers suggested retail price (MSRP) of the vehicle; (ii) a prediction of depreciation of the vehicle resulting from the elapsed time between termination of the lease and sale of the vehicle; (iii) a probability (PR) that the vehicle will be returned to the lessor by the lessee at termination of the lease; and (iv) a probability (PM) that termination will occur at the scheduled maturity date.

23. The method of claim 22, wherein the predicted return market value loss (RMVL) corresponds to the following equation:

$$RMVL=MVL+(MSRP*(\alpha*t)*PR*PM),$$

where MSRP is substantially equal to the manufacturers suggested retail price (MSRP) of the vehicle, and $\alpha*t$ is the prediction of the depreciation of the vehicle resulting from the elapsed time between termination of the lease and sale of the vehicle.

24. The method of claim 23, wherein the probability of return (PR) is a function of at least one of: (i) the MVL; (ii) a state (ST) in which the lease originated; (iii) the vehicle's model (M); (iv) the lessee's income (INC); (v) the predicted depreciation (D) of the vehicle; (vi) the lessee's savings balance (SAV); (vii) the lessee's credit risk (R); (viii) a number of loans per household (L) for those having the lessee's demographic profile; (ix) the vehicle's loan to value ratio (LTV); (x) the vehicle's color (C); (xi) the vehicle's book month (B); (xii) the reserve amount (RA); (xiii) the lessee's depth of credit experience (DC); and (xiv) a ratio of the MVL and the residual value (MVL/RV).

25. The method of claim 24, wherein the probability of return (PR) is in accord with the following equation:

$$PR=1/(1+EXP(-1*(-\alpha+A1*MVL+A2*ST+A3*M+A4*INC+A5*D+A6*SAV+A7*R+A8*L+A9*LTV+A10*C+A11*B+A12*RA+A13*DC+A14*MVL/RV))),$$

where, Ai represent coefficients obtained using regression analysis.

26. The method of claim 23, wherein the predicted market value loss is a function of at least one of: (i) the return market value loss (RMVL); (ii) a purchase market value loss (PMVL); and (iii) miles and damage (M&D).

27. The method of claim 26, wherein the predicted market value loss is in accord with the following expression: MVL=RMVL+PMVL−M&D.

28. The method of claim 27, wherein the PMVL is a predetermined percentage of RMVL.

29. The method of claim 28, wherein the PMVL is about 15% to 22% of RMVL.

30. The method of claim 27, wherein the lessor has a plurality of leased vehicles, the method further comprising the acts of:

obtaining a net reserve for each vehicle; and aggregating the net reserves to obtain a reserve position on the plurality of leased vehicles.

31. The method of claim 23, further comprising the act of: assigning a value for the elapsed time for the vehicle between the termination and the sale.

32. The method of claim 31, wherein the elapsed time is a number of months between the termination and the sale.

33. The method of claim 32, wherein the number of months is selected from 0 months to about 4 months.

34. The method of claim 32, wherein the value for the elapsed time is selected as a function of probabilities that the vehicle will be sold at the termination month and subsequent months.

* * * * *